(12) United States Patent
Choudhury et al.

(10) Patent No.: US 11,431,682 B2
(45) Date of Patent: Aug. 30, 2022

(54) ANONYMIZING A NETWORK USING NETWORK ATTRIBUTES AND ENTITY BASED ACCESS RIGHTS

(71) Applicant: International Business Machines Corporation, Armonk, NY (US)

(72) Inventors: Olivia Choudhury, Cambridge, MA (US); Panagiotis Karampourniotis, Cambridge, MA (US); Yoonyoung Park, Cambridge, MA (US); Issa Sylla, Boston, MA (US); Amarendra Das, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/580,871

(22) Filed: Sep. 24, 2019

(65) Prior Publication Data
US 2021/0092100 A1    Mar. 25, 2021

(51) Int. Cl.
*H04L 9/40* (2022.01)
*H04L 41/5019* (2022.01)

(52) U.S. Cl.
CPC ...... *H04L 63/0421* (2013.01); *H04L 41/5019* (2013.01)

(58) Field of Classification Search
CPC .............. H04W 12/02; H04L 41/5019; H04L 63/0421; G06F 21/6254; G06F 2221/2141
See application file for complete search history.

(56) References Cited

U.S. PATENT DOCUMENTS

| | | | |
|---|---|---|---|
| 9,344,284 B2 | 5/2016 | Walker et al. | |
| 9,477,694 B2* | 10/2016 | Gkoulalas-Divanis | ...................... G06F 16/21 |
| 9,672,469 B2 | 6/2017 | Talley et al. | |
| 9,692,768 B1 | 6/2017 | Kayyoor et al. | |
| 9,760,718 B2 | 9/2017 | Braghin et al. | |
| 9,858,426 B2 | 1/2018 | Freudiger et al. | |
| 10,084,595 B2 | 9/2018 | Mohajeri et al. | |
| 10,169,610 B2 | 1/2019 | Dubov et al. | |
| 2012/0029938 A1 | 2/2012 | Lauter et al. | |

(Continued)

OTHER PUBLICATIONS

Srivastava et al. "Determining Privacy Utility trade-off for online Social Network data Publishing" 2015 Annual IEEE conference INDICON pp. 1-6.*

(Continued)

*Primary Examiner* — Frantz B Jean
(74) *Attorney, Agent, or Firm* — Amin, Turocy & Watson, LLP

(57) ABSTRACT

Systems, computer-implemented methods, and computer program products that can facilitate anonymizing a network based on factors including network attributes, node attributes, and edge attributes describing connections between nodes are described. According to an embodiment, a system can comprise a memory that stores computer executable components and a processor that executes the computer executable components stored in the memory. The computer executable components can comprise an anonymizing component that can anonymize network information of the network based on a network attribute for a network and a node attribute of a first node of the network, resulting in an anonymized network.

20 Claims, 10 Drawing Sheets

(56) References Cited

U.S. PATENT DOCUMENTS

| | | | |
|---|---|---|---|
| 2013/0160138 A1* | 6/2013 | Schultz | G06F 21/6254 726/27 |
| 2014/0380489 A1* | 12/2014 | Hacid | G06F 21/6254 726/26 |
| 2016/0371508 A1* | 12/2016 | McCorkendale | G06F 21/6254 |
| 2018/0218173 A1 | 8/2018 | Perkins et al. | |
| 2018/0248871 A1* | 8/2018 | Tsirkin | H04W 12/06 |
| 2019/0026493 A1 | 1/2019 | York et al. | |
| 2019/0066135 A1 | 2/2019 | Darg | |
| 2019/0130129 A1 | 5/2019 | Huang et al. | |
| 2019/0005266 A1 | 7/2019 | York et al. | |
| 2020/0401726 A1* | 12/2020 | Lim | H04L 9/0822 |

OTHER PUBLICATIONS

Fatima et al. "Access Privilege Control To Protect Cloud Data By Using Anonymous Attribute." International Journal of Engineering Sciences & Research Technology, 5(5): May 2016. 5 pages.

Mohammady et al. "Preserving Both Privacy And Utility In Network Trace Anonymization." arXiv:1810.10464v1 [cs.CR] Oct. 24, 2018. 18 pages.

Wang et al. "A Graph-Based Multifold Model For Anonymizing Data With Attributes Of Multiple Types." Computers & Security 72 ( 2018 ) 122-135. 14 pages.

Zhang et al. "Feature Selection For Classification Under Anonymity Constraint." Transactions on Data Privacy 10 (2017). 25 pages.

Zheleva et al. "Preserving the Privacy of Sensitive Relationships in Graph Data." In Privacy, security, and trust in KDD (pp. 153-171). Springer, Berlin, Heidelberg. 2008. 20 pages.

Liu et al. . Towards identity anonymization on graphs. Proceedings of the 2008 ACM SIGMOD international conference on Management of data(pp. 93-106). ACM. 14 pages.

Bhagat et al. Class-based graph anonymization for social network data. Proceedings of the VLDB Endowment, vol. 2 Issue 1, Aug. 2009.12 pages.

Zhou et al. "Preserving Privacy in Social Networks Against Neighborhood Attacks." 2ICDE '08 Proceedings of the 2008 IEEE 24th International Conference on Data Engineering Apr. 7-12, 2008. 10 pages.

Loukides et al. "COAT: Constraint-based anonymization of transactions." Knowledge and Information Systems, 28 (2), pp. 251-282., Aug. 2011. 32 pages.

Palanisamy et al. "Privacy-preserving Publishing of Multi-level Utility Controlled Graph Datasets." ACM Transactions on Internet Technology (TOIT), 18(2), p. 24. Aug. 201719 pages.

International Search Report and Written Opinion received for PCT Application Serial No. PCT/EP2020/075975 dated Nov. 3, 2020, 13 pages.

Srivastava et al. "Determining Privacy Utility Trade-off for Online Social Network Data Publishing", Conference: 2015 Annual IEEE India Conference (INDICON), Dec. 2015, 6 pages.

Tian et al. "Betweenness Centrality Based k-Anonymity for Privacy Preserving in Social Networks", MoMM2018: Proceedings of the 16th International Conference on Advances in Mobile Computing and Multimedia, Nov. 2018, 5 pages.

* cited by examiner

700

790

|  | ID | Name 720 | Birthday 730 | Zip Code 740 | Gender 750 |
|---|---|---|---|---|---|
| 710A | 1 | Aiden Smith | 5-May-2000 | 55001 | M |
| 710B | 2 | Jack Smith | 10-Jun-2000 | 55001 | M |
| 710C | 3 | Michael Miller | 12-Jun-2000 | 55001 | M |
| 710D | 4 | Desmond Jones | 13-Jun-2000 | 55001 | M |
| 710E | 5 | Sally White | 14-Jan-2000 | 65001 | F |
| 710F | 6 | Heather Black | 15-Feb-2000 | 65001 | F |
| 710G | 7 | Gia Davis | 5-Mar-2000 | 65001 | F |
| 710H | 8 | Katie Smith | 7-Mar-2000 | 65001 | F |
| 710I | 9 | Joey Jones | 6-Apr-2000 | 55003 | M |
| 710J | 10 | Richie Nelson | 5-May-2000 | 55003 | M |
| 710K | 11 | Connor Peterson | 5-Jun-2000 | 55003 | M |

ANONYMIZING A NETWORK USING NETWORK ATTRIBUTES AND ENTITY BASED ACCESS RIGHTS

BACKGROUND

The subject disclosure relates to computer networks, and more specifically, to anonymizing computer networks.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, methods, and computer-implemented methods are described that can facilitate anonymizing a network based on factors including network attributes, node attributes, and edge attributes of connections between nodes.

According to an embodiment, a system can comprise a memory that can store computer-executable components and a processor that can execute the computer-executable components stored in the memory, with the computer-executable components comprising an anonymizing component that can anonymize network information of the network based on a network attribute for a network and a node attribute of a first node of the network, resulting in an anonymized network. According to a variation of the above described embodiment, connection information corresponding to a connection between the first node and a second node can comprise an edge attribute, and the anonymizing the network information can be further based on the edge attribute. According to another variation of the above described embodiment, the anonymizing the network information can be further based on a privacy constraint that can mandate a level of privacy for the anonymized network.

In an additional embodiment of the system described above, the computer-executable components of the system can further include a constraint component that can generate the privacy constraint based on the network information. In a variation of the additional embodiment, the constraint component can generate the privacy constraint further based on a privacy rule, and wherein the privacy rule applies to the first node. In further embodiments, the constraint component can further determine an access right for the first node, and the constraint component can generate the privacy constraint further based on the access right.

In yet another variation of the above described system, the anonymizing the network information can be further based on a utility constraint for the anonymized network, and wherein the utility constraint comprises a first measure of a utility of the anonymized network based on a requirement of a consumer. Adding additional features to this variation, in another embodiment, the computer-executable components of the system can further comprise an optimality component that can select the utility constraint that optimizes, or increases an optimality of, the anonymizing the network information, this optimizing being based on an anonymizing characteristic of the anonymizing the network information. In some implementations, the anonymizing characteristic can include a second measure of a loss of information during the anonymizing the network information. In other implementations, the anonymizing characteristic can include a number of edits of the network performed during the anonymizing the network information.

In an implementation of the system described above, the network information can comprise healthcare information of a plurality of patients. Alternatively, in one or more embodiments, the network can comprise a social media network of a plurality of users.

One or more embodiments of a computer-implemented method can comprise generating, by a device operatively coupled to a processor, a network attribute for a network. Further, the method can comprise anonymizing, by the device, network information of the network based on the network attribute and a node attribute of a first node of the network, resulting in an anonymized network.

In a variation of the above-described method, connection information corresponding to a connection between the first node and a second node can comprise an edge attribute, and the anonymizing of the network information can be further based on the edge attribute. In an additional variation of the method, the anonymizing the network information can be further based on a privacy constraint that can mandate a level of privacy for the anonymized network.

In a variation of computer-implemented method described above, the method can further comprise generating the privacy constraint based on a privacy rule, and the privacy rule can apply to the first node. In additional embodiments, the anonymizing the network information can be further based on a utility constraint for the anonymized network, and the utility constraint can comprise a measure of a utility of the anonymized network based on a requirement of a consumer. In an embodiment of the method having additional operations, the method can further comprise selecting the utility constraint that can optimize, or can increase an optimality of, the anonymizing the network information, based on an anonymizing characteristic of the anonymizing the network information.

In an additional set of embodiments, a computer program product can facilitate anonymizing network information, with the computer program product comprising a computer readable storage medium having program instructions embodied therewith, the program instructions being executable by a processor to cause the processor to generate, by the processor, a network attribute for a network of connected nodes, and ones of a plurality of the connected nodes can comprise a node attribute, that can result in a plurality of node attributes. Further, the generating the network attribute can be based on the plurality of node attributes. The processor can be further caused to generate, by the processor, a privacy constraint based on network information of the connected nodes, and the privacy constraint can mandate a level of privacy for an anonymized network. In this embodiment, the processor can further be caused to anonymize, by the processor, the network information of the connected nodes, resulting in the anonymized network, based on the network attribute, the plurality of node attributes, and the privacy constraint.

In a variation of the above embodiment, the anonymizing the network information can be further based on a utility constraint for the anonymized network, and the utility constraint can comprise a first measure of a utility of the anonymized network based on a requirement of a consumer. In another embodiment based on the computer program product above, instructions further cause the processor to select, by the processor, the utility constraint that optimizes, or increases an optimality of, the anonymizing the network information, based on a second measure of a loss of information during the anonymizing the network information.

DESCRIPTION OF THE DRAWINGS

FIG. 7 depicts a table of sample data from a network to be anonymized using different approaches, in accordance with one or more embodiments.

FIGS. 8A-8B depict two alternative approaches to anonymizing the data depicted in FIG. 7, in accordance with one or more embodiments.

DETAILED DESCRIPTION

Figure 1:
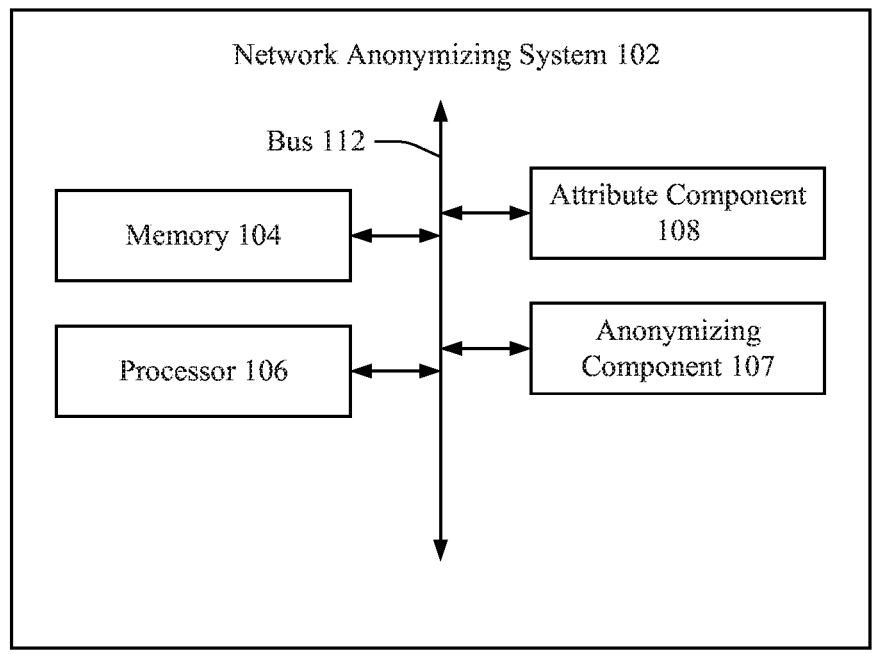
FIG. 1 illustrates a block diagram of an example of a non-limiting network anonymizing system that can facilitate anonymizing a network based on factors including network attributes, node attributes, and edge attributes describing connections between nodes, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

It should be appreciated that the embodiments of the subject disclosure depicted in various figures disclosed herein are for illustration only, and as such, the architecture of such embodiments are not limited to the systems, devices, and/or components depicted therein.

One or more embodiments are described herein in the context of sharing some amount of data from an otherwise restricted access network. Some embodiments described herein are applied to restricted networks having some data that is sought after for public and private reasons. One example of this type of networks used frequently herein for illustration purposes is a network storing and proving healthcare data, e.g., information on hospitals, patients, treatments, and other related information.

Because healthcare networks can provide data that is both, subject to legal and ethical restrictions, and also sought after for public and private purposes, these networks can provide an example context for applications of principles described here, e.g., networks where anonymization can be used to share patient data with researchers, while complying with all legal and ethical requirements. As discussed further below, in many circumstances, one or more embodiments can evaluate privacy and utility constraints when selecting approaches to anonymization, and anonymization parameters to use, e.g., the k value in the k-anonymity approach described below.

It should be noted that, although healthcare networks are used at times herein to illustrate concepts of embodiments, these are non-limiting examples, and other types of networks in use now, and developed in the future, can be used with one or more embodiments described herein. For example, association membership networks, human resources networks, networks of transaction data, and social networks can also contain sought after data that is protected from disclosure in many circumstances.

Generally speaking, as described herein one or more embodiments can facilitate a network anonymization that can incorporate different types of attributes for anonymization, e.g., node attributes, edge attributes, and network attributes. Further, one or more embodiment can facilitate the anonymization of network data such that utility of the anonymized network is improved while privacy requirements of individual nodes of the original are satisfied, e.g., as a trade-off between privacy and utility constraints.

FIG. 1 illustrates a block diagram of an example 100 of non-limiting network anonymizing system 102 that can facilitate anonymizing a network based on factors including network attributes, node attributes, and edge attributes describing connections between nodes, in accordance with one or more embodiments described herein. Repetitive description of like elements and/or processes employed in respective embodiments is omitted for sake of brevity. Some embodiments can comprise a network anonymizing system 102. In some embodiments, network anonymizing system 102 can comprise attribute component 108, anonymizing component 107, and any other components associated with network anonymizing system 102 as disclosed herein.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network anonymizing system 102 can further comprise various computer and/or computing-based elements described herein with reference to operating environment 1000 and FIG. 10. For example, in some embodiments, network anonymizing system 102 can further comprise memory 104, processor 106, and bus 112. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and instruction(s). For example, memory 104 can store computer and otherwise machine readable, writable, and/or executable components and/or instructions that, when executed by processor 106, can facilitate execution of the various functions described herein relating to network anonymizing system 102, attribute component 108, anonymizing component 107, and any other components associated with network anonymizing system 102 as described herein, with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), erasable programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or a combination of different central processing units, multi-core processors, microprocessors, dual microprocessors, microcontrollers, Systems on a Chip (SOC), array processors, vector processors, and any other type of processor. Further examples of processor 106 are described below with reference to processing unit 1014 and FIG. 10. Such examples of processor 106 can be employed to implement any embodiments of the subject disclosure.

In some embodiments, elements of network anonymizing system 102, including, but not limited to memory 104, processor 106, attribute component 108, anonymizing component 107, and any other component of network anonymizing system 102 as described herein, can be communicatively, electrically, and/or operatively coupled to one another via bus 112 to perform functions of network anonymizing system 102, and any other components coupled therewith. In several embodiments, bus 112 can comprise one or more of a memory bus, memory controller, peripheral bus, external bus, local bus, or another type of bus that can employ various bus architectures. Further examples of bus 112 are described below with reference to system bus 1018 and FIG. 10. Such examples of bus 112 can be employed to implement any embodiments of the subject disclosure.

In some embodiments, network anonymizing system 102 can comprise any type of component, machine, device, facility, apparatus, and/or instrument that comprises a processor and/or can be capable of effective and/or operative communication with a wired and/or wireless network. All such embodiments are envisioned. For example, network anonymizing system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, network anonymizing system 102 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, network anonymizing system 102 can be coupled (e.g., communicatively, electrically, operatively, etc.) to one or more external systems, sources, and/or devices (e.g., computing devices, communication devices, etc.) via a network.

According to multiple embodiments, network anonymizing system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with network anonymizing system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, attribute component 108 and anonymizing component 107, and any other components associated with network anonymizing system 102 as disclosed herein (e.g., communicatively, electronically, and/or operatively coupled with and/or employed by network anonymizing system 102), can comprise such computer and/or machine readable, writable, and/or executable component(s) and/or instruction(s). Consequently, according to numerous embodiments, network anonymizing system 102 and/or any components associated therewith as disclosed herein, can employ processor 106 to execute such computer and/or machine readable, writable, and/or executable component(s) and/or instruction(s) to facilitate performance of one or more operations described herein with reference to network anonymizing system 102 and/or any such components associated therewith.

Figure 2:
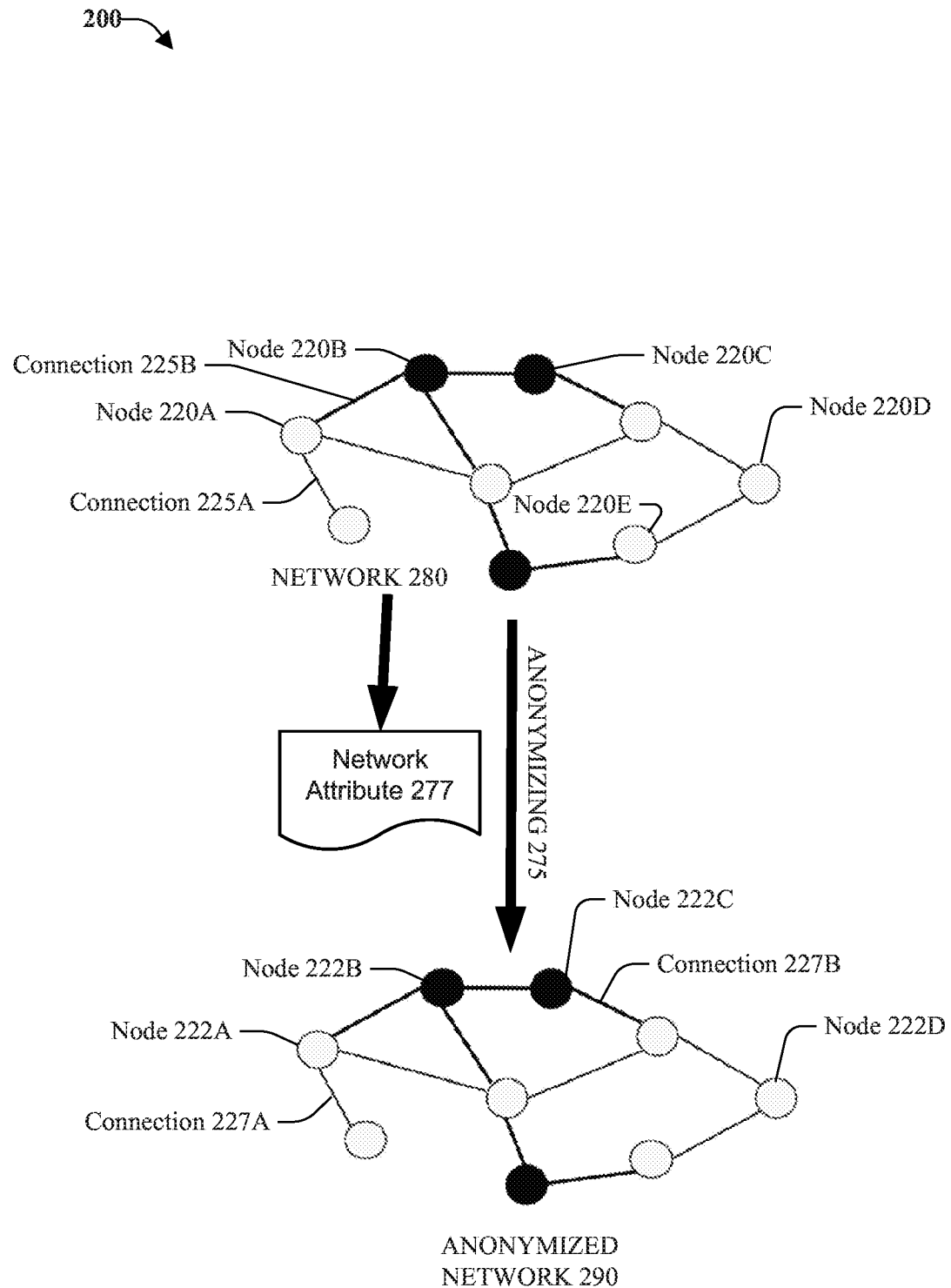
FIG. 2 illustrates a block diagram of an example, non-limiting system that can facilitate anonymizing a network based on factors including a network attribute, data of nodes, and edge attributes describing connections between nodes, in accordance with one or more embodiments described herein.

Returning to the operation of components depicted in FIG. 1, in one or more embodiments, as discussed further with FIG. 2, different attributes of nodes of a network can be used to facilitate the anonymization process as well as improve the utility of the anonymized network 280. Different attributes of network nodes can include, but are not limited to, for healthcare networks, patient data, such as identifiers, name, diagnoses, and other similar data. As discussed further with FIGS. 3-4, another node attribute that can be used include characteristics of the entities stored by a particular node, e.g., nodes can have security requirement based on a type of entity. For example, in a healthcare system, patient data can have more restrictive access requirements than human resources data and general data about different healthcare facilities.

In addition to the use of existing node attributes for anonymization, one or more embodiments can analyze network data and identify attributes based on the network data, e.g., network attributes. For example, in one or more embodiments, attribute component 108 can generate a network attribute for the network based on the analysis of connected nodes. In one or more embodiments, network attributes generally refer to attributes describing the entire network or a relationship between a node and other nodes of the network. Example network attributes that can be used by one or more embodiments described herein include, but are not limited to, a total number of nodes, a total number of connections, average degree of nodes within the network, and different measures of the network centrality of a node. Example network centrality attributes can include a measure of in-degrees and out-degrees of nodes, e.g., a count of data flows into a node and out of a node, respectively. Other examples of network centrality include betweenness centrality, e.g., a measure of the centrality of a node in a graph based on shortest paths between nodes.

Another example network attribute that can describe the network centrality of a node includes the closeness centrality of a network node, e.g., how many nodes are between the node and other nodes of the network. In one or more embodiments, this value can be generated, e.g., by attribute component 108, by taking an average of the shortest path length from the node to every other node in the network. It should be appreciated that, in alternative embodiments, as opposed to generating the network attribute, attribute component 108 can retrieve a previously generated network attribute for use in anonymization.

As discussed further below with an example healthcare network depicted in FIG. 2, by incorporating network attributes in the anonymization process, these network attributes can be available, in one or more embodiments, to consumers querying the resulting anonymized network. As described further below, although node and edge attributes can be used for network analytics, by incorporating overall network attributes into the anonymization process, one or more embodiments can facilitate additional types of network analytics data to be produced from anonymized networks.

For example, in one or more embodiments, a measure of network centrality for a node can be incorporated in the anonymization process, and this can result in this centrality value being available to consumers of the anonymized network 290, along with anonymized node attributes and edge attributes. One having skill in the relevant art(s), given the description herein, would appreciate that, in addition to being used by consumers independently of other anonymized network data, for some applications, different network attributes can be beneficially combined with anonymized node data. For example, an epidemiological researcher, after identifying an anonymized node with medical data indicating a contagious condition, can further query the anonymized network for different measures of the network centrality of the identified node, e.g., to analyze the role of the node in the spread of the condition to other nodes within the anonymized network.

Figure 3:
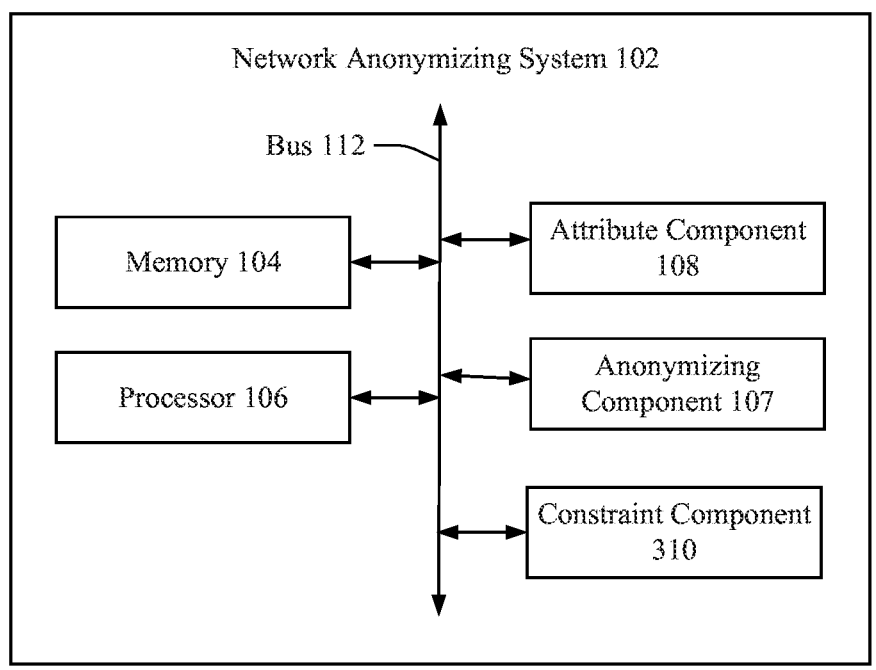
FIG. 3 illustrates a block diagram of an example of a non-limiting network anonymizing system that can facilitate anonymizing a network based on factors including network attributes, node attributes, and edge attributes describing connections between nodes, in accordance with one or more embodiments described herein.
Figure 4:
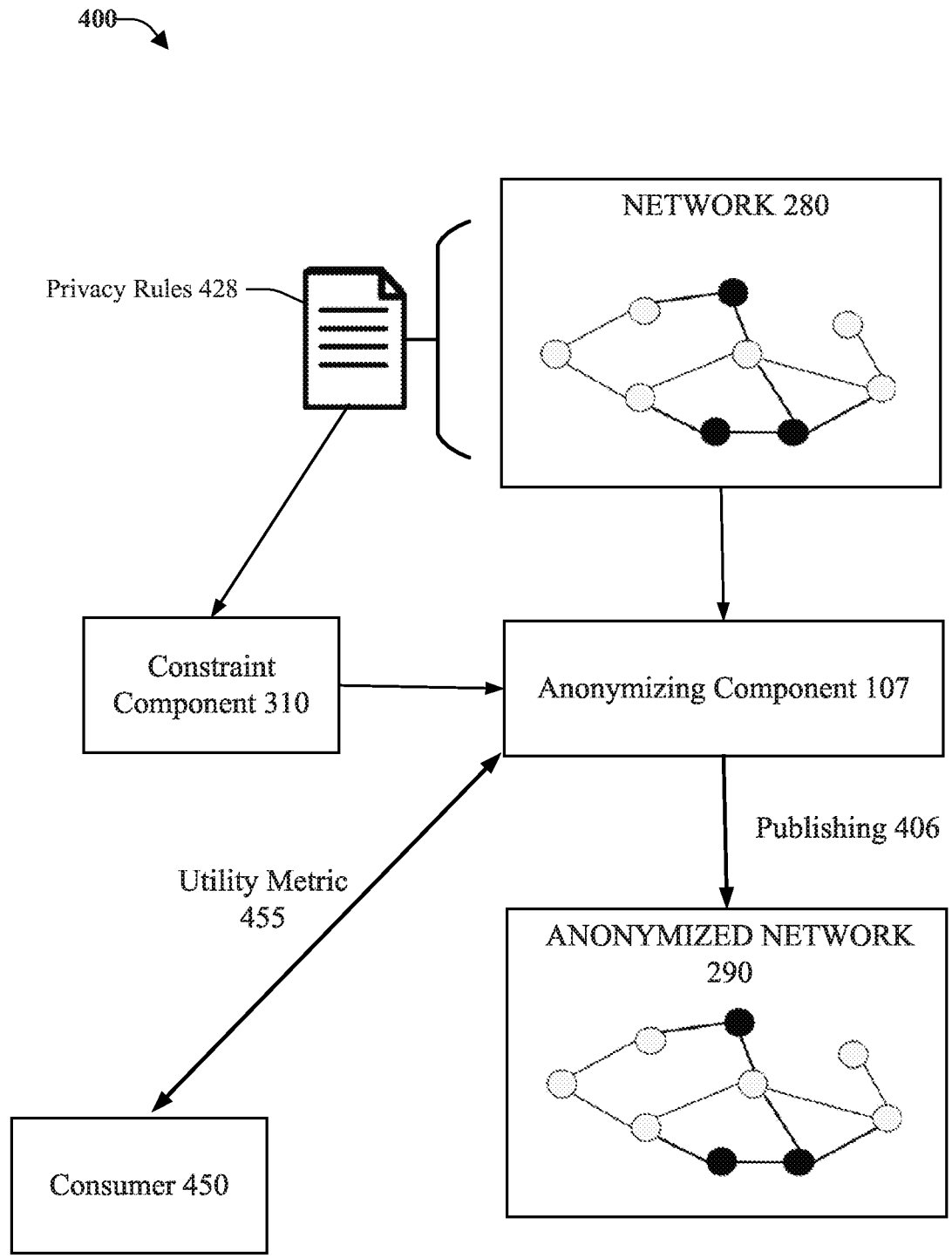
FIG. 4 illustrates a block diagram of an example, non-limiting system that can facilitate anonymizing component publishing anonymized network for use by consumer, in accordance with one or more embodiments.
Figure 5:
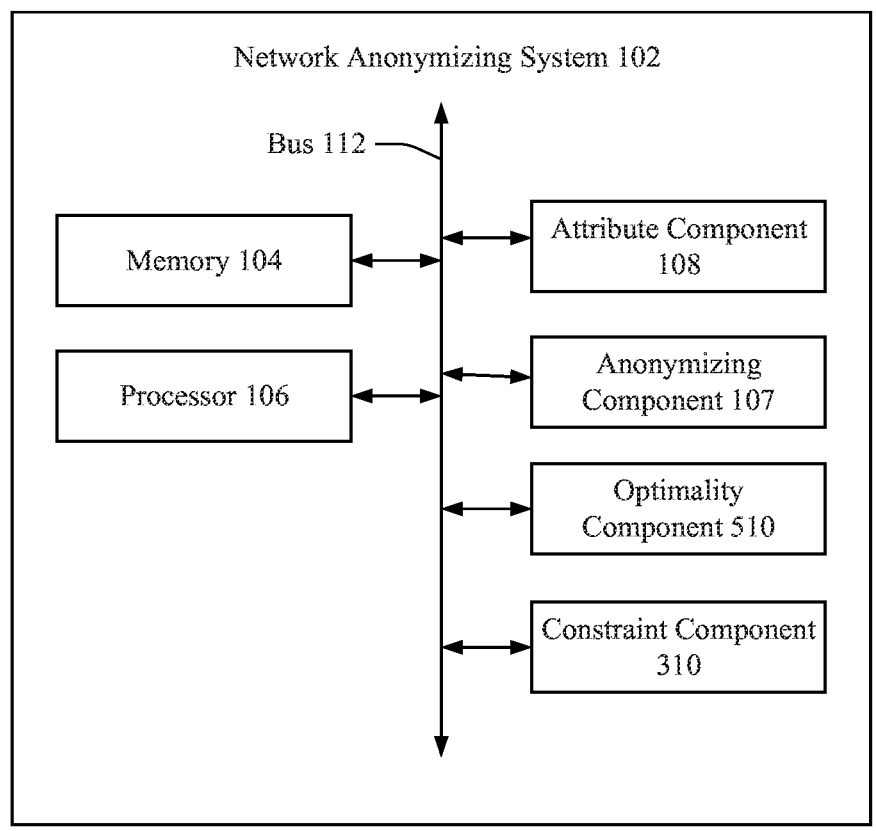
FIG. 5 illustrates a block diagram of an example of non-limiting network anonymizing system that can facilitate anonymizing a network based on factors including network attributes and using privacy data from nodes of the network, in accordance with one or more embodiments described herein.
Figure 6:
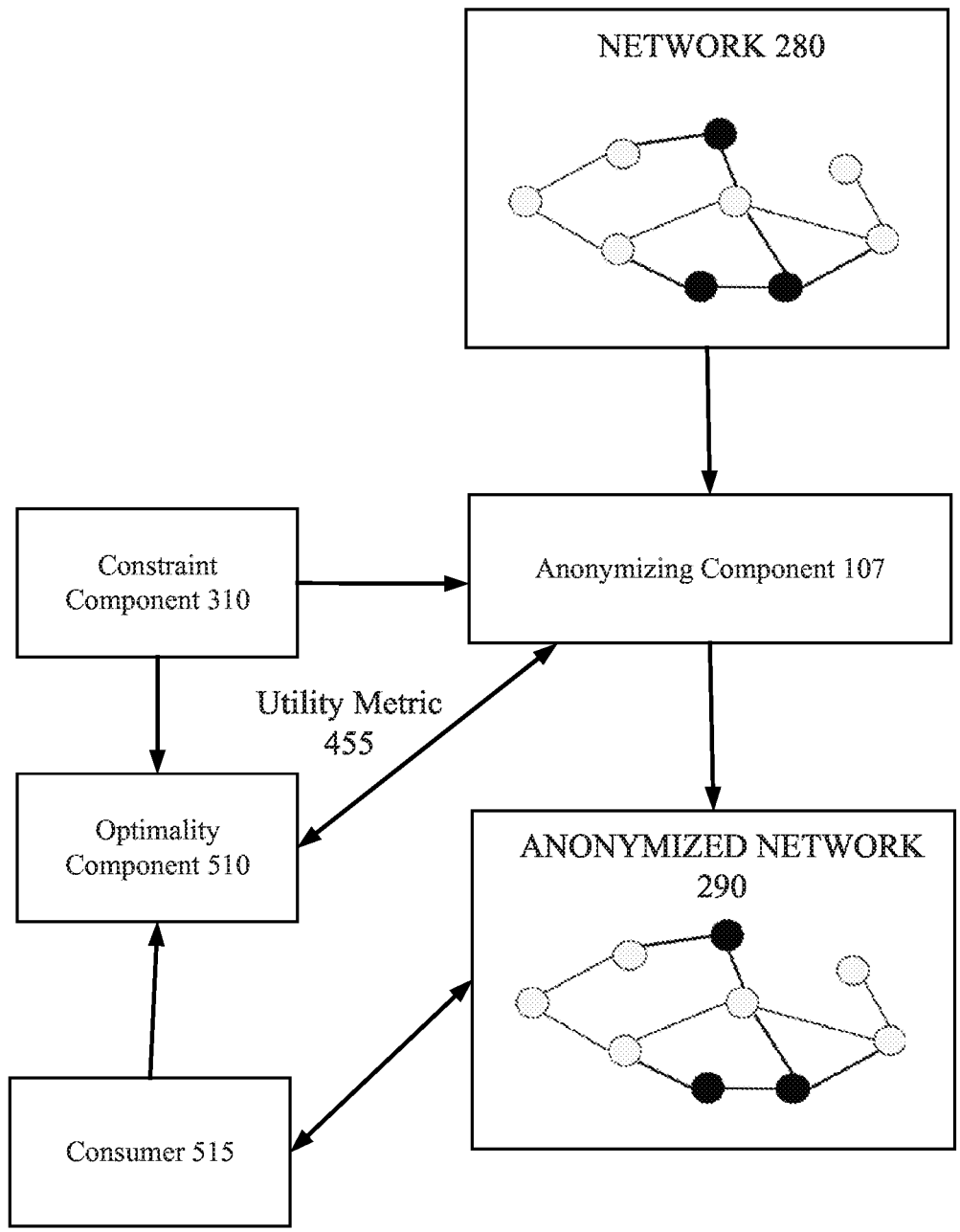
FIG. 6 illustrates a block diagram of an example, non-limiting system 600 that can facilitate anonymizing a network based on factors including network attributes, node attributes, and edge attributes describing connections between nodes, in accordance with one or more embodiments described herein.
Figures 8A, 8B:
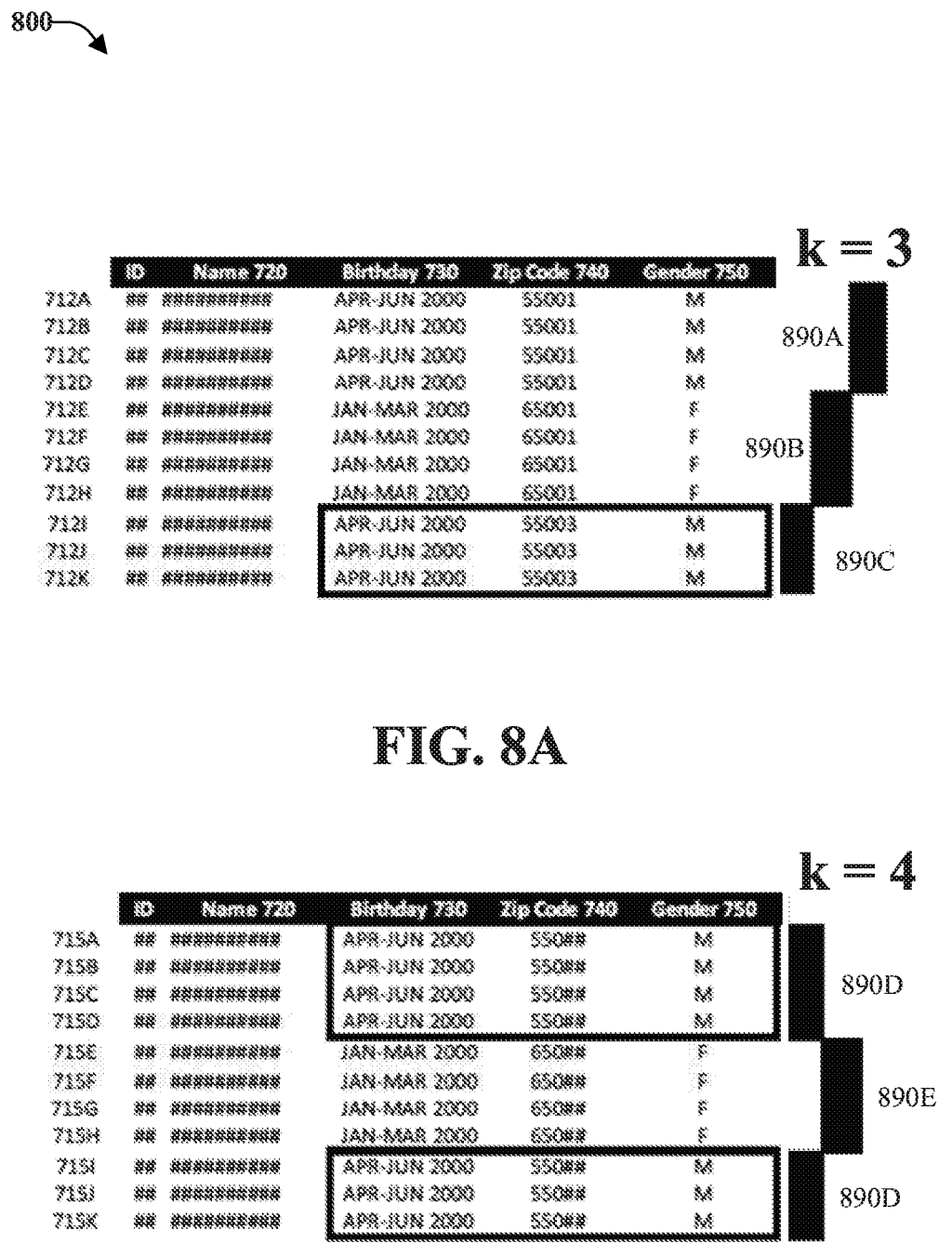

With respect to other aspects of one or more embodiments discussed below, FIG. 2 depicts a process of transforming a network into an anonymized network by employing processes similar to those discussed above with anonymizing component 107 and network attributes, as described above, that can be generated by attribute component 108, in accordance with one or more embodiments. FIGS. 3-4 describe a constraint component 310 that can be used by one or more embodiments to generate constraints for use by anonymizing component 107. FIGS. 5-6 describe an optimality component 510 that can be used by one or more embodiments anonymize a network based both on the utility provided to consumers 515 and constraints generated by constraint component 310. Further to the operation of example implementations of optimality component 510, FIGS. 7-8B depicts example ways that the utility of an anonymized network can be adjusted based on requirements of a consumer, in view of required constraints for the anonymized data.

FIG. 2 illustrates a block diagram of an example, non-limiting system 200 that can facilitate anonymizing 275 network 280 based on factors including network attribute 277, data of nodes 220A-220D, and connections 225A-B between nodes, in accordance with one or more embodiments described herein. Repetitive description of like elements and/or processes employed in respective embodiments is omitted for sake of brevity.

In some embodiments, system 200 can include network 280 transformed by anonymizing 275 process into anonymized network 290. Network 280, in one or more embodiments can include multiple nodes, e.g., nodes 220A-D, variously connected by connections including connection 225A-B. In one or more embodiments, anonymized network 290 can include nodes 222A-D, anonymized from nodes 220A-D, respectively.

In an example, network 280 is a healthcare network comprising hospitals, with each node 220A-D in system 200 representing a hospital, and connections 225A-B between two nodes representing collaborative links between the hospital nodes. In this example, the node attributes of hospital nodes 220A-D can include the location of the hospital, the specialty of the hospital, number of physicians per specialty admitted to the hospital, number of patients in the hospital, and a metric corresponding to the performance of the hospital, e.g., a number of readmissions or an average cost per treatment). In one or more embodiments, the node attribute level of detail can be termed detail to a microscopic degree. After a more detailed discussion of the anonymizing 275 process, attribute levels for network 280 are discussed for both the mesoscopic level, e.g., edge attributes that can provide data regarding clusters of hospitals within the network, and the macroscopic level, e.g., network attributes 277 that can provide summary data for the network, as well as data describing placement of individual nodes within the network and relationships with other nodes.

Continuing a general discussion of one or more embodiments, as noted above, once generated by attribute component 108 or otherwise identified by one or more embodiments, different attributes can be incorporated into the anonymization process. For example, in one or more embodiments, anonymizing component 107 can facilitate anonymizing network information of a network based on attributes discussed above, e.g., types of attributes including but not limited to, node attributes, edge attributes, and network attributes 277.

In another example, network 280 can be a social network of interconnected users, with each node 220A-D in system 200 representing a user, and connections 225A-B between two nodes representing connections between the user nodes. In this example, the node attributes of user nodes 220A-D can include, for the user, location, connection information, postings, age, and other user information. One having skill in the relevant art(s), given the description herein, will appreciate how network attributes 277 described below for the healthcare network example can be applied to other networks, such as this social network example.

With respect to examples of why and when anonymization can be employed by one or more embodiments, it would be appreciated by one having skill in the relevant art(s), given the disclosure herein, that data that is restricted from being provided can often be transformed in some way so as to not be subject to the same restrictions. One type of transformation that can be employed by one or more embodiments is the process of anonymizing data to a degree that it satisfies a level of anonymity, e.g., specific nodes stored cannot be individually identified using the released data. For example, if a set of patient data is to be released to a researcher, the data released should not be able to individually identify specific patients, e.g., attributes such as patient identifiers, social security numbers, telephone numbers, email addresses, and other similar data, can all be used in many circumstances to identify a single individual. In one or more embodiments, this type of data can be removed or obscured from the anonymized network.

Another level of anonymization that can be employed to protect certain types of data, prohibits the release of information that, in combination with other reasonably available data can, within a particular likelihood, identify an entity. For example, if two or more of the different types of data (e.g., birthdate, zip code, gender) are included in anonymized patient data, these values can, in some cases be combined with publicly available birthdate, zip code and gender data to identify individual patients. FIGS. 7-8B provide examples of how combinations of birthdate, zip code and gender can be combined to identify individuals. One or more embodiments can, when used with different anonymization approaches, can prevent node data from being directly and associatively identified in anonymized data.

The underlying anonymization technical can be unimportant to the one or more embodiments, and hence the one or more embodiments can be potentially applied to different, existing methods, such as k-anonymity, l-diversity, etc. One having skill in the relevant art(s), given the description herein, will appreciate how these approaches can be used, and that approaches developed in the future will also be able to be used, with one or more embodiments.

An example anonymization approach that can be used by one or more embodiments is the k-anonymity approach. In some implementations, generally speaking, the k-anonymity approach can use different transformations to anonymize data such that, for anonymized data, at least k number of entities are similar enough that they cannot be discerned from each other. For example, for a k=3 value, at least three entities are present in the anonymized network with attributes removed or transformed such that at least three records cannot be discerned from each other. Thus, for a k=3 value, data can be anonymized such that, for example, for a given zip code, if a complete birthday is included in the anonymized data, no less than three records have the same combination. For example, in large zip codes (e.g., having populations greater than 50,000 people), consistently having multiple individuals with the same birthday may be likely, possible, but it is not likely for typical zip code sizes, and not every individual in a large zip code may be included in the data to be anonymized.

Multiple examples of the k-anonymization process are described below with FIGS. 7-8B, with a dataset shown in FIG. 7 being transformed by example k-anonymity approaches. For example, FIG. 8A depicts an example use of a k-anonymity approach where k=3 and FIG. 8B depicts an example where k=4. Other example values of k that can be used by one or more embodiments include k values from 3-15, or any other value determined to be beneficial for the process.

As described above, one or more embodiments can incorporate a network attribute 277 for a node 220A (e.g., a measure of node centrality) into anonymized data for the node, e.g., node 222A of anonymized network. It should be noted that, based on the anonymization approaches described above, one or more embodiments can anonymize networks such that incorporation of network attribute 277 in the anonymized network data preserves the set level of anonymity required by the anonymizing process, e.g., as described for k-anonymity above.

It should be note that, as described further with FIG. 5 below, during the anonymization process, one or more embodiments can automatically adjust the approaches used by anonymization approaches so as to optimize, or increase the optimality of, the anonymization process given the types of queries that the anonymized network is designed to support, e.g., the utility of the anonymized network.

Returning to the discussion of healthcare network 280 of FIG. 2, in an example, an anonymized version of network 280 is sought that can provide network analytics in a privacy-preserving way. According to example requirements, anonymized data should support queries at the mesoscopic level. For example, queries that can identify communities of hospitals that collaborate more often, along with the performance of these collaborations. In one or more embodiments, example edge attributes for connections 225A-B can support these requirements by generating and including edge attributes for pairs of hospitals linked by the respective connections, e.g., a number of shared patients, an average performance when sharing patients, and performance metrics for treatment of shared patients.

In this example, additional requirements for anonymized network 290 can include data to support queries at the macroscopic level, e.g., network attributes discussed with FIG. 1 above. In one or more embodiments, by incorporating overall network attributes 277 into the anonymizing 275 process of network 280, additional data can be available in anonymized network 290 that can provide a more holistic view of the network, and, in some circumstances improve the overall utility of the anonymized network. For example, insights from anonymized networks that can be revealed using network attributes include, but are not limited to, characteristics of one or more nodes in the network that influence characteristics of other nodes.

Additional queries can relate to a degree sequence of hospital, e.g., the distribution of the load of collaboration between hospitals. For all of these additional requirements at the macroscopic level, network attributes 277 can be generated and included in the anonymizing 275 process. For example, utilizing network attributes 277 such as betweenness centrality and clustering coefficient during anonymization can provide data that can highlight the hospitals that have high influence in their network, e.g., high betweenness centrality for a hospital can occur because of links between other hospitals going through the high influence hospital.

Another example network attribute 277 that can support data analytics at the macroscopic level measures in-degree and out-degree centrality of a hospital, e.g., in some circumstances, a high out-degree centrality for a hospital can be indictive of the hospitals which tend to send out many of their patients, while high in-degree centrality can be indicative of hospitals that receive transferred patients.

It should be noted that nodes 220A-D are depicted as being either black or white, with these colors indicating that network 280 incudes nodes 220A-D that can have different privacy levels. As described with FIGS. 3-4 below, one or more embodiments can provide entity-based access rights for access to anonymized network 290

In some embodiments, network anonymizing system 102 can be associated with various technologies. For example, network anonymizing system 102 can be associated with healthcare technologies, database technologies, computing technologies, artificial intelligence (AI) model technologies, machine learning (ML) model technologies, cloud computing technologies, Internet-of-Things (IoT) technologies, and/or other technologies.

According to multiple embodiments, networks, such as network 280 and anonymized network 290 can comprise wired and wireless networks, including, but not limited to, a local area network (LAN), a cellular network, a wide area network (WAN) (e.g., the Internet) or a storage area network (SAN). For example, network anonymizing system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, network anonymizing system 102 can thus include hardware (e.g., a central processing unit (CPU), a transceiver, a decoder), software (e.g., a set of threads, a set of processes, software in execution) or a combination of hardware and software that facilitates communicating information between network anonymizing system 102 and external systems, sources, and/or devices (e.g., computing devices, communication devices, etc.).

FIGS. 3 and 4 are discussed together below to highlight the use of different components in the anonymizing process. FIG. 3 illustrates a block diagram of an example 300 of non-limiting network anonymizing system that can facilitate anonymizing a network based on factors including network attributes, node attributes, and edge attributes describing connections between nodes, in accordance with one or more embodiments described herein. In some embodiments, network anonymizing system 102 can comprise attribute component 108, anonymizing component 107, constraint component 310, and any other components associated with network anonymizing system 102 as disclosed herein.

FIG. 4 illustrates a block diagram of an example 400, non-limiting system that can facilitate anonymizing component 107 publish[ing] 406 anonymized network 280 for use by consumer 450, in accordance with one or more embodiments. The utility of anonymized network 280 for consumer 450 can be quantified by utility metric 455. Constraint component 310 can generate a privacy constraint for anonymizing component 107 based on privacy rules 428 that can be for the entire network 280, or specific to individual nodes of network 280. Repetitive description of like elements and/or processes employed in respective embodiments is omitted for sake of brevity With FIG. 2 above, the anonymization of additional combinations of data is described, e.g., network attributes 277. With FIG. 3, privacy constraints are described that are generated that can limit anonymizing component 107 in the creation of anonymized network 290. In one or more embodiments, these privacy constraints can limit how the anonymizing 275 process is performed, e.g., specifying a value for k when anonymizing component 107 uses the k-anonymous method described above.

In additional embodiments, constraint component 310 can facilitate providing entity-based access rights for access to anonymized network 290. In one or more embodiments, this approach can allow anonymizing component 107 to enforce privacy based on entity-based access rights, thereby restricting unauthorized data access or inference. Thus, in one or more embodiments, privacy constraints can be based on the data access rights each node or entity stored with a node, with these privacy constraints being protected in the anonymized network.

In one or more embodiments, using privacy constraints that can be based on the data access rights each node or entity stored with a node, can provide flexibility to handle access to different types of data. For example, in contrast to many standard hospitals, like one or more embodiments, some mental health hospitals secure the privacy of nodes based on different node types, not based on access rights granted to users. Further to this, it should be noted that, because access rights are received from node attributes of individual nodes, in one or more embodiments, this approach does not need to use the role of data requester to determine the level of anonymization to be applied by anonymizing component 107. It should be noted that, in alternative embodiments, user and role-based access rights also be used exclusively, or combined with the entity-based approach described above.

FIG. 5 illustrates a block diagram of an example 500 of non-limiting network anonymizing system 102 that can facilitate anonymizing a network based on factors including network attributes and using privacy data from nodes of the network, in accordance with one or more embodiments described herein. Repetitive description of like elements and/or processes employed in respective embodiments is omitted for sake of brevity. In some embodiments, network anonymizing system 102 can comprise attribute component 108, anonymizing component 107, constraint component 310, optimality component 510, and any other components associated with network anonymizing system 102 as disclosed herein.

In one or more embodiments, the anonymizing the network 280 by anonymizing component 107 can be further based on combinations of data, retrieval of which anonymized network will be required to support. Because, as noted above, one or more embodiments support the retrieval of data from anonymized network 290 by including original or modified versions of the data in the anonymization process. Further, these combinations of data to be retrieve from anonymized network 290 can be embodied in requirements of the anonymized network.

In an example, the requirement of a researcher can specify aspects of the granularity of data to be retrieved, thus specifying the granularity of data stored during anonymization. In this example, the researcher is doing research based on seasons of the year a person was born. Because, as noted above, birthdates can be identifying characteristics that are rarely included in an original form in anonymized data, one or more anonymization approaches can use bins of different sizes to introduce ambiguity into the birthdate attribute. In this example, because the research is based on a season of birth, the granularity of the anonymized data can be the three-month length of a season. Thus, similar to the example depicted with FIGS. 7-8B discussed below, for anonymization, in accordance with the requirements of the researcher, precise birthdates can be separated into bins corresponding to the three-month season interval. In addition, because of this aggregation of birthdays, in this example, anonymity requirements of constraint component 310 can also be satisfied.

One or more embodiments can evaluate the overall usefulness of an anonymized network, and subsequently generate utility constraints that can constrain a reduction in capabilities for anonymized network 290. An example of a reduction in utility of an anonymized network is described with FIG. 8B below, e.g., based on alternative anonymization strategies used to satisfy privacy constraints generated by constraint component 310.

In additional embodiments, to evaluate and adjust both the utility and privacy constraints, the computer-executable components can further include optimality component 510. In one approach, because privacy constraints for some types of data can be rigid, optimality component 510 can select a utility constraint that can optimize, or increase an optimality of, the anonymizing process of anonymizing component 107, based on some selected anonymizing characteristic of the anonymizing process. In one or more embodiments, anonymizing characteristics can include, but are not limited to, a degree to which information is lost during the anonymizing the network information. For example, in an example anonymization approach, optimality component 510 can select the smallest k value that is determined to satisfy the privacy constraints of the network to be anonymized, e.g., because increasing the number of entities (k) that are required to be indistinguishable can necessarily result in a increased loss of data in anonymized network 290.

Other anonymizing characteristics used for optimization can include but are not limited to, a number of network edits performed during the anonymizing process, e.g., changes to the structure of the original network data to support anonymization. Example graph edits to the anonymized network can include, but are not limited to, edge addition/removal, edge swapping between any two nodes or addition/removal of nodes, edge attribute aggregation or anonymization. For example, to increase an iteration towards a required level of anonymity. In addition to the above, network edits can include, as discussed above, and depicted in FIGS. 8A-B, node attribute aggregation, such as increasing the granularity of stored anonymized data by aggregating attribute values in different bins.

FIG. 6 illustrates a block diagram of an example, non-limiting system 600 that can facilitate anonymizing network 280 based on factors including network attributes, node attributes, and edge attributes describing connections between nodes, in accordance with one or more embodiments described herein. Repetitive description of like elements and/or processes employed in respective embodiments is omitted for sake of brevity.

In some embodiments, system 600 can include network 280 transformed by anonymizing component 107 and published 406 as anonymized network 290. Network 280 and anonymized network 290, in one or more embodiments can include multiple connected nodes, e.g., as described with FIG. 2 above. In one or more embodiments, constraint component 310 can be communicatively connected to anonymizing component 107. Further, anonymized network consumer 450 can be communicatively coupled to anonymized network 290, with a utility of this access being described by utility metric 455.

For illustrative purposes, the description of FIG. 6 below describes another approach to the operation of optimality component 510, in accordance with one or more embodiments. In this example, utility constraints (U) can be used that are based on combinations of one or more of node attributes, edge attributes, and network attributes that are preferred attributes to be provided by anonymized network 290 in response to requests from consumer 515. Further to this example, privacy constraints (P) can based on the nodes' current privacy level in network 280, e.g., defining privacy constraints based on user or entity-defined access rights of different nodes.

Based on the above constraints, optimality component 510 can analyze network 280 to identify different anonymity approaches, with P as a hard constraint and U as a soft constraint, e.g., because privacy constraints are often rigid legal or ethical rules. The different anonymity approaches can be evaluated according to criteria, such as an objective function, e.g., such as loss of information during anonymization, graph edits, or other optimizing criteria.

During the evaluation of approaches by optimality component 510, a penalty can be used to disfavor a selection of anonymity approaches that fail to maintain preferred attributes in U. In one or more embodiments, employing a penalty function can systematically improve the overall utility of anonymized network 290, e.g., for node, edge, and network attributes, without compromising privacy. In some embodiments, this interaction of P and U can be described as a trade-off between P and U.

In another, more detailed example of the operation of optimality component 510, in one or more embodiments, for an example network G=(V, E), where V and E denote the set of nodes and edges respectively, let $X_V$, $X_E$, and $X_N$ respectively denote the node attributes, edge attributes, and network attributes of G. Further, let A be the set of access rights for all nodes, and $A_v$ be the access rights defined by node v, and where v∈V, let P and U. Let $X_G$ the set of network attributes to be retained, e.g., the preferred attributes for satisfying consumer requirements, as discussed above.

In operation, U can be applied to an ordered list of $X_V$, $X_E$, and $X_G$, based on an implementation choice, in accordance with one or more embodiments, and for each v∈V, based on $A_v$, update permissible attributes of $X_{V_v}$, $X_{E_v}$, and $X_{N_v}$. Continuing this example, privacy constraint P can be set by constraint component 310 for anonymization based on the set of access rights A. Anonymize the data such that it satisfies P as a hard constraint, while U (such as a particular network attribute, for e.g., betweenness centrality of a set of nodes) remains as similar as possible in G and in the anonymized G'.

In conjunction with the anonymization process, in one or more embodiments, a penalty function F(G) can be implemented that can retain the property of the node, edge, or network attributes without compromising privacy constraint. In an additional approach, some of the optimality approaches described herein can assign weights attributes, based on different factors, including the priority of preserving their utility. In some implementations, in order to achieve the above constraints on each iteration, a change in the structure of anonymized network 290 can be determined, this change, in some circumstances, moving the results of the anonymizing towards the satisfaction of P while it penalizes changes on U (such as a network centrality property of a set of nodes).

FIG. 7 depicts a table 700 of sample data from a network to be anonymized using different approaches, in accordance with one or more embodiments. Table 700 includes 11 patients 710A-710K, each having attributes corresponding to an ID, name 720, birthday 730, zip code 740, and gender 750.

Analyzing the data, it can be noted that the patients 710A-710K are from three different zip codes 740, and have unique IDs and names 720. For reference in a discussion anonymizing approaches in FIGS. 8A-8B, attribute combination 790 is highlighted to emphasize this identifying combination of birthday 730, zip code 740, and gender 750.

FIGS. 8A-8B depict two alternative approaches to anonymizing the data depicted in FIG. 7, in accordance with one or more embodiments. Repetitive description of like elements and/or processes employed in respective embodiments is omitted for sake of brevity.

FIG. 8A depicts an anonymization of table 700 using a k-anonymity approach where k=3. It should be noted that, for illustrative purposes, the examples of FIG. 7-8B include two types of attributes, attributes that can directly identify a person (e.g., ID and name 720), and attributes that are publicly available, and in combination, can sometimes be used to identify specific people.

As noted above, different embodiments can adjust an anonymization approach based on the requirements of the requesters of the data. In this example, different instances of a condition of patients 712A-712K are sought to be studied (not shown), and would include information about this condition along with demographic data that can be used for research, e.g., age determined from birthday 730, zip code 740 for residence information, and gender 750. In this example, the age of an individual in months is a requirement.

In this example, the anonymization approach begins be removing ID and name 720, as non-required data that can identify a person. It should be noted that, like name, birthday is also unique to patients in the system but, because this data is requested to be available, a different approach to anonymization can be used by one or more embodiments that does not require removing the data. For example, as depicted in birthday 730, in this example, months of the year are placed in four-month groups for anonymization. As highlighted in FIG. 8A, for this dataset, this approach satisfies the k=3 requirement, e.g., at least k number of patients 712A-712K are similar enough that they cannot be discerned from each other, e.g., patients 712I-712K.

Referring back to the discussion of requirements and utility discussed with FIGS. 5-6, in this example an age in months is a utility constraint and k=3 is a privacy constraint. Further, it should be noted that, by selecting the three-month grouping approach to birthday 730 used, the utility value to the researchers could have been decreased, e.g., age in months can only be known within the three-month ranges used. The significance of this increased imprecision can depend on the specifics of the research being performed. With a larger variety of attributes in a real dataset, options for anonymizing where birthday is represented by month and year may be available.

FIG. 8B depicts another example anonymization of table 700, in accordance with one or more embodiments. In this example, privacy requirements are stricter than the previous example, e.g., k=4. In selecting alternative approaches, one or more embodiments can determine that only two different zip code prefix values (e.g., 550 and 650) are included in the data. Thus, instead of further grouping birthday 730 and correspondingly reducing utility of the anonymized age data, two groups of zip code prefixes can be used.

Thus, as depicted, patients 715A-715D and patients 715I-715K were previously distinguishable from each other by different zip code 740 values, but, because these differences are not in the zip code prefix, by using this approach, the groups form a block 890D of 7 indistinguishable patients 715A-K. Because records 715E-715H form a block 890E of 4 indistinguishable patient records, the new k value for the table is k=4.

It should be noted that, the detailed discussion of anonymizing approaches included above are intended, inter alia, to illustrate how requirements and privacy restrictions can relate to a particular set of data, e.g., if the data were different, such as the birth years being different among the patients, a different approach would have to be used.

Another concept that should be appreciated based on the discussion above is the variety of different approaches to anonymization that can be used, even with a small, simple set of data. With an available variety of approaches that can be used to satisfy utility requirements and privacy requirements, in one or more embodiments, optimality component 510 can, in some circumstances, make small adjustments that can improve the performance of anonymized networks.

It is to be appreciated that one or more embodiments descried herein can utilize various combinations of electrical components, mechanical components, mass storage, and circuitry that cannot be replicated in the mind of a human or performed by a human. For example, analyzing, processing and anonymizing networks of related information is greater than the capability of a human mind. For instance, the operation of anonymizing component 107, can be performed faster that could be performed by a human mind over the same period of time.

According to several embodiments, network anonymizing system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that network anonymizing system 102 can obtain, analyze, and process information that is impossible to obtain, analyze, and process manually by an entity, such as a human user. For example, the type, amount, and/or variety of information included in network anonymizing system 102, attribute component 108, anonymizing component 107, and any other components associated with network anonymizing system 102 as disclosed herein, can be more complex than information able to be obtained manually by a human user.

Figure 9:
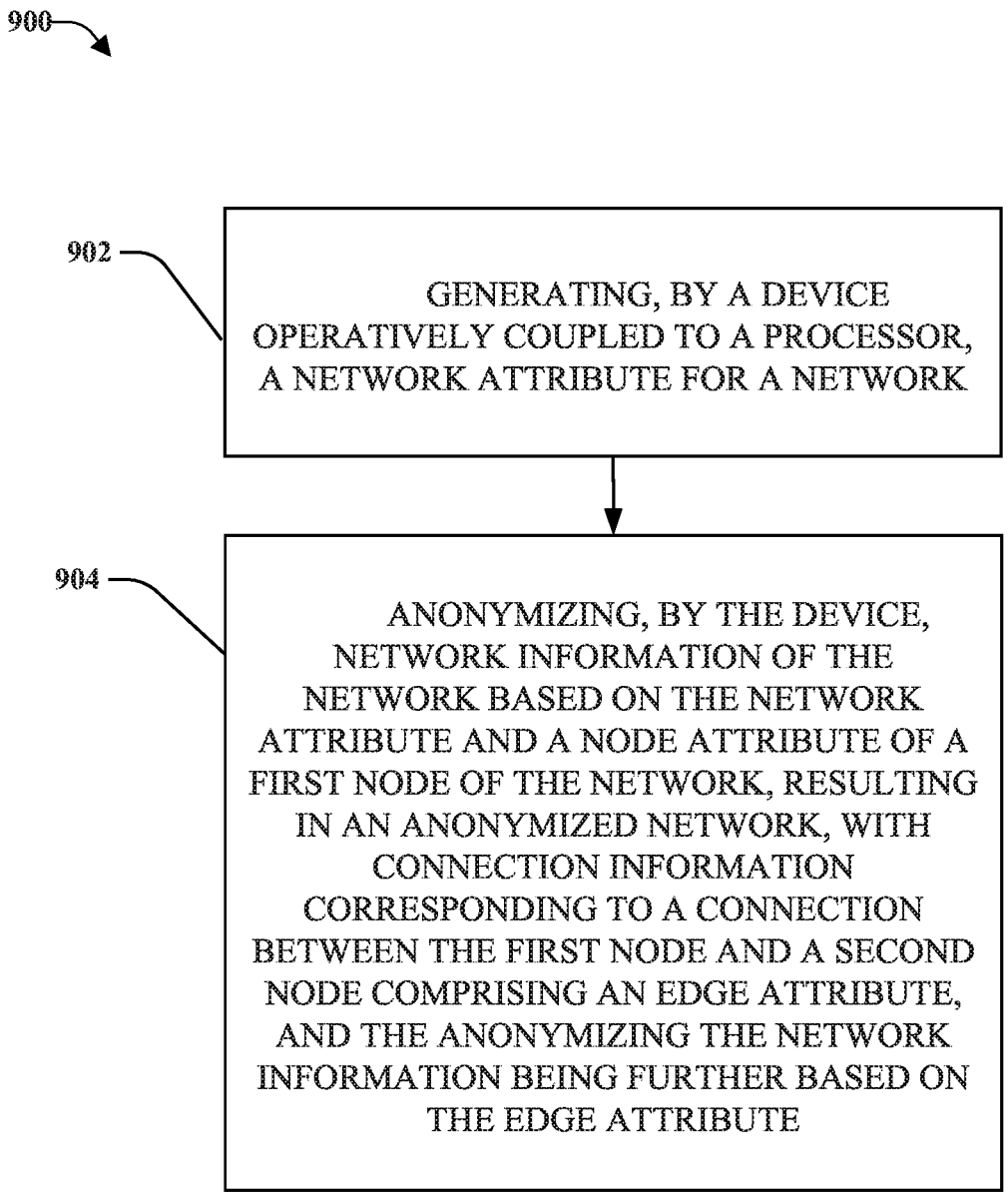
FIG. 9 illustrates a flow diagram of an example, non-limiting computer-implemented method that can facilitate anonymizing a network using network attributes and entity-based access rights, in accordance with one or more embodiments described herein.

FIG. 9 illustrates a flow diagram of an example, non-limiting computer-implemented method 900 that can facilitate anonymizing network 280 based on factors including network attributes 227, node attributes, and connections 225A-B between nodes 220A-B, in accordance with one or more embodiments described herein. Repetitive description of like elements and/or processes employed in respective embodiments is omitted for sake of brevity.

In some embodiments, at 902, computer-implemented method 900 can comprise generating, by a device operatively coupled to processor, network attribute for network. For example, one or more embodiments can generate, by a device (e.g., network anonymizing system 102) operatively coupled to a processor (e.g., processor 106), a network attribute (e.g., network attribute 277) for the network (e.g., network 280).

In some embodiments, at 904, computer-implemented method 900 can comprise anonymizing, by the device, network information of the network based on the network attribute and a node attribute of a first node of the network, resulting in an anonymized network, with connection information corresponding to a connection between the first node and a second node comprising an edge attribute, and the anonymizing the network information being further based on the edge attribute. For example, one or more embodiments can anonymize, by the device (e.g., anonymizing component 107 in network anonymizing system 102), network information of the network (e.g., network 280) based on the network attribute (e.g., network attribute 277) and a node attribute of a first node (e.g., node 220A) of the network (e.g., network 280), resulting in an anonymized network (e.g., anonymized network 290), with connection information corresponding to a connection (e.g., connection 225B) between the first node (e.g., node 220A) and a second node (e.g., node 220B) comprising an edge attribute, and the anonymizing the network information being further based on the edge attribute.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
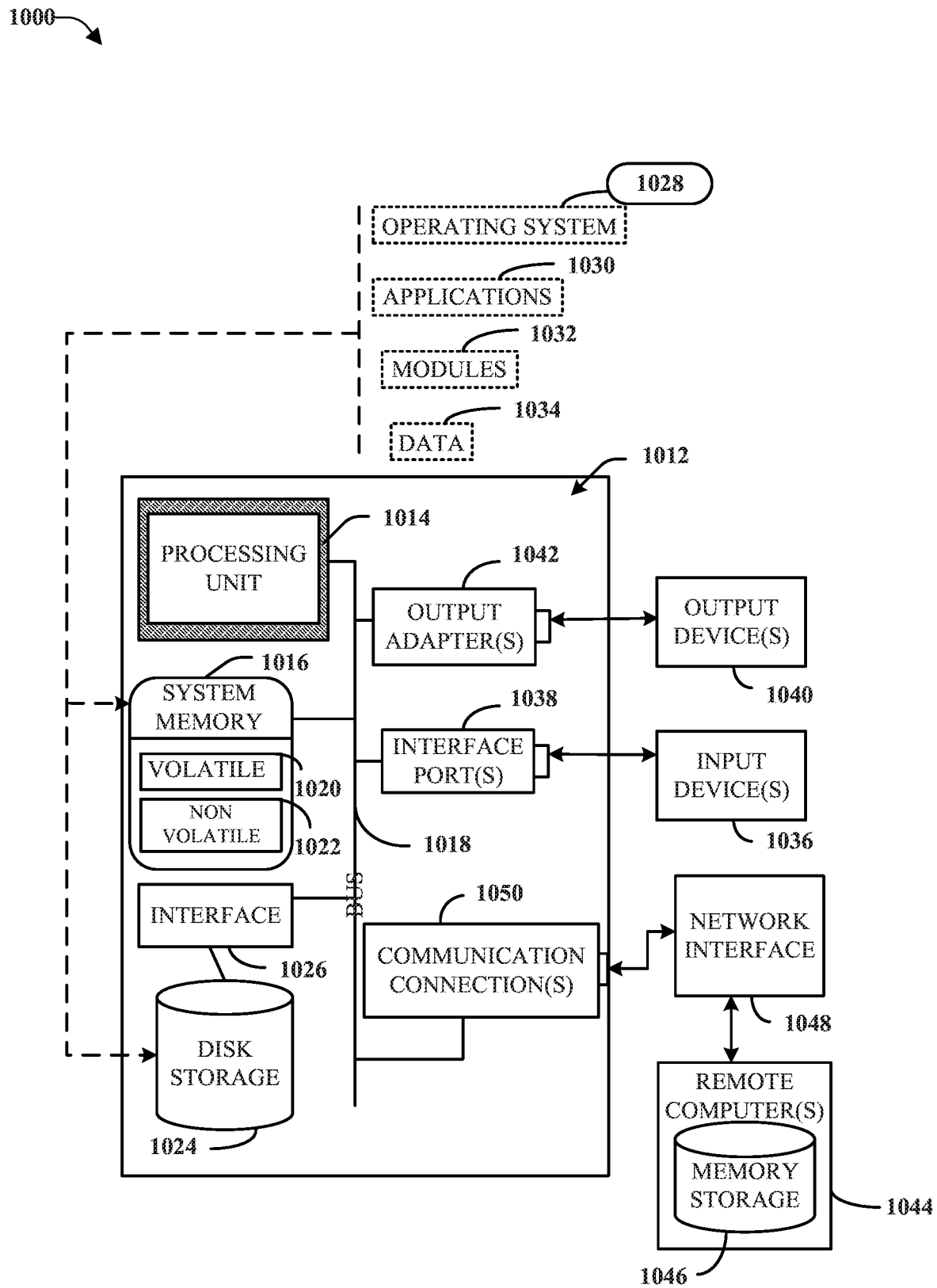
FIG. 10 illustrates a block diagram of an example, non-limiting operating environment in which one or more embodiments described herein can be facilitated.

FIG. 10 depicts an example context the various aspects of the disclosed subject matter, e.g., this figure, as well as the following discussion are intended to provide a general description of a suitable environment in which the various aspects of the disclosed subject matter can be implemented, in accordance with one or more embodiments. Repetitive description of like elements and processes employed in respective embodiments is omitted for sake of brevity.

FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal, and external technologies such as, modems including regular telephone grade modems, cable modems and DSL modems, ISDN adapters, and Ethernet cards.

The present invention may be a system, a method, an apparatus, and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flow diagram and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computer, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components;
   a processor that executes the computer-executable components stored in the memory, wherein the computer-executable components comprise:
   an anonymizing component that:
      selects, using an objective function with an optimizing criterion, an anonymization approach from a group of anonymization approaches based on a privacy constraint, a utility constraint, and a penalty function based on edge attributes, node attributes, and network attributes of a network of nodes, and
      anonymizes, using the anonymization approach, network information of the network of nodes based on a network attribute for the network and a node attribute of a first node of the nodes of the network, resulting in an anonymized network.

2. The system of claim 1, wherein connection information corresponding to a connection in the network between the first node and a second node of the nodes comprises an edge attribute of the connection, and wherein the anonymizing the network information is further based on the edge attribute.

3. The system of claim 1, wherein the anonymizing the network information is further based on the privacy constraint that mandates a level of privacy for the anonymized network.

4. The system if claim 3, wherein the computer-executable components further comprise a constraint component that generates the privacy constraint based on the network information.

5. The system of claim 4, wherein the constraint component further determines an access right for the first node, and wherein the constraint component generates the privacy constraint further based on the access right.

6. The system of claim 3, wherein the anonymizing the network information is further based on the utility constraint for the anonymized network, and wherein the utility constraint comprises a first measure of a utility of the anonymized network based on a requirement of a consumer.

7. The system of claim 6, wherein the computer-executable components further comprise an optimality component that selects the utility constraint that optimizes, or increases an optimality of, the anonymizing the network information, based on an anonymizing characteristic of the anonymizing the network information.

8. The system of claim 7, wherein the anonymizing characteristic comprises a second measure of a loss of information during the anonymizing the network information.

9. The system of claim 7, wherein the anonymizing characteristic comprises a number of edits of the network performed during the anonymizing the network information.

10. The system of claim 1, wherein the network information comprises healthcare information of a plurality of patients.

11. The system of claim 1, wherein the network comprises a social media network of a plurality of users.

12. A computer-implemented method, comprising:
    generating, by a device operatively coupled to a processor, a network attribute for a network of nodes; and
    selecting, by the device, using an objective function with an optimizing criterion, an anonymization approach from a group of anonymization approaches based on a privacy constraint, a utility constraint, and a penalty function based on edge attributes, node attributes, and network attributes of the network, and
    anonymizing, by the device, using the anonymization approach, network information of the network based on the network attribute and a node attribute of a first node of the nodes of the network, resulting in an anonymized network.

13. The computer-implemented method of claim 12, wherein connection information corresponding to a connection in the network between the first node and a second node of the nodes comprises an edge attribute of the connection, and wherein the anonymizing the network information is further based on the edge attribute.

14. The computer-implemented method of claim 12, wherein the anonymizing the network information is further based on the privacy constraint that mandates a level of privacy for the anonymized network.

15. The computer-implemented method of claim 14, further comprising generating the privacy constraint based on a privacy rule, and wherein the privacy rule applies to the first node.

16. The computer-implemented method of claim 14, wherein the anonymizing the network information is further based on the utility constraint for the anonymized network, and wherein the utility constraint comprises a measure of a utility of the anonymized network based on a requirement of a consumer.

17. The computer-implemented method of claim 16, further comprising selecting the utility constraint that optimizes, or increases an optimality of, the anonymizing the network information, based on an anonymizing characteristic of the anonymizing the network information.

18. A computer program product facilitating anonymizing network information, the computer program product comprising a non-transitory computer readable storage medium having program instructions embodied therewith, the program instructions executable by a processor to cause the processor to:
  generate, by the processor, a network attribute for a network of connected nodes, wherein ones of a plurality of the connected nodes comprise a node attribute, resulting in a plurality of node attributes, and wherein the generating the network attribute is based on the plurality of node attributes;
  generate, by the processor, a privacy constraint based on network information of the connected nodes, wherein the privacy constraint mandates a level of privacy for an anonymized network;
  select, by the processor, using an objective function with an optimizing criterion, an anonymization processes from a group of anonymization processes based on the privacy constraint, a utility constraint, and a penalty function based on edge attributes, the node attributes, and network attributes of the network, and, and
  anonymize, by the processor, using the anonymization processes, the network information of the connected nodes, resulting in the anonymized network, based on the network attribute, the plurality of node attributes, and the privacy constraint.

19. The computer program product of claim 18, wherein the anonymizing the network information is further based on the utility constraint for the anonymized network, and wherein the utility constraint comprises a first measure of a utility of the anonymized network based on a requirement of a consumer.

20. The computer program product of claim 19, wherein program instructions further cause the processor to select, by the processor, the utility constraint that optimizes, or increases an optimality of, the anonymizing the network information, based on a second measure of a loss of information during the anonymizing the network information.

* * * * *